United States Patent
Sandraz

(10) Patent No.: US 10,176,464 B2
(45) Date of Patent: Jan. 8, 2019

(54) POINT OF SALE DEVICE LEVERAGING A PAYMENT UNIFICATION SERVICE

(71) Applicant: HEWLETT PACKARD ENTERPRISE DEVELOPMENT LP, Houston, TX (US)

(72) Inventor: Dominique Sandraz, Sunnyvale, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 274 days.

(21) Appl. No.: 14/909,225

(22) PCT Filed: Aug. 20, 2013

(86) PCT No.: PCT/US2013/055682
§ 371 (c)(1),
(2) Date: Feb. 1, 2016

(87) PCT Pub. No.: WO2015/026322
PCT Pub. Date: Feb. 26, 2015

(65) Prior Publication Data
US 2016/0189117 A1   Jun. 30, 2016

(51) Int. Cl.
*G06Q 20/00* (2012.01)
*G06Q 20/02* (2012.01)
(Continued)

(52) U.S. Cl.
CPC .......... *G06Q 20/027* (2013.01); *G06Q 20/18* (2013.01); *G06Q 20/20* (2013.01); *G06Q 20/401* (2013.01)

(58) Field of Classification Search
CPC .............. G06Q 20/18; G06Q 20/027
(Continued)

(56) References Cited

U.S. PATENT DOCUMENTS 6,138,107 A    10/2000  Elgamal
7,600,676 B1 * 10/2009  Rados .................... G06Q 20/40
                                                              235/380

(Continued)

FOREIGN PATENT DOCUMENTS

CN     1348566 A      5/2002
CN   101595491 A     12/2009
CN   102656599 A      9/2012

OTHER PUBLICATIONS

Chen, W. et al., NFC Mobile Transactions and Authentication Based on GSM Network, 2nd International Workshop on Near Field Communication, IEEE, Apr. 20, 2010, pp. 83-89.

(Continued)

*Primary Examiner* — Rokib Masud
(74) *Attorney, Agent, or Firm* — Hewlett Packard Enterprise Patent Department

(57) ABSTRACT

Example embodiments relate to a point of sale device leveraging a payment unification service. In some examples, a system may include instructions for a seller unification gateway to receive, via a network, a transaction initiation signal from a point of sale device. The transaction initiation signal may be in response to a purchase request of a buyer that interacts with the point of sale device. The system may include instructions for the seller unification gateway to send, via a network, a transaction authorization request to a buyer unification gateway. The system may include instructions for the buyer unification gateway to receive, via a network, an authorization response from a buyer device near or in the point of sale device. The authorization response may be generated in response to the buyer interacting with the buyer device.

20 Claims, 8 Drawing Sheets

(51) Int. Cl.
*G06Q 20/20* (2012.01)
*G06Q 20/18* (2012.01)
*G06Q 20/40* (2012.01)

(58) Field of Classification Search
USPC .............................................. 705/15, 16, 19
See application file for complete search history.

(56) References Cited

U.S. PATENT DOCUMENTS

| | | |
|---|---|---|
| 8,327,141 B2 | 12/2012 | Vysogorets et al. |
| 8,412,625 B2 | 4/2013 | Pilo |
| 2005/0182720 A1* | 8/2005 | Willard ................ G06Q 20/102 705/40 |
| 2007/0156579 A1* | 7/2007 | Manesh ................ G06Q 20/10 705/39 |
| 2008/0154735 A1* | 6/2008 | Carlson ................ G06Q 20/18 705/16 |
| 2008/0183589 A1 | 7/2008 | Dixon et al. |
| 2009/0157518 A1 | 6/2009 | Bishop |
| 2009/0157519 A1* | 6/2009 | Bishop .................. G06Q 20/02 705/19 |
| 2009/0228336 A1 | 9/2009 | Giordano et al. |
| 2012/0179558 A1* | 7/2012 | Fischer .................. G06Q 20/20 705/16 |
| 2012/0310743 A1 | 12/2012 | Johri |
| 2013/0030934 A1 | 1/2013 | Bakshi et al. |

OTHER PUBLICATIONS

International Search Report and Written Opinion, PCT Patent Application No. PCT/US2013/055682, dated Jun. 2, 2014, 14 pages.

* cited by examiner

POINT OF SALE DEVICE LEVERAGING A PAYMENT UNIFICATION SERVICE

CROSS-REFERENCE TO RELATED APPLICATION

This application is a U.S. National Stage Application of and claims priority to international Patent Application No. PCT/US2013/055682, filed on Aug. 20, 2013, and entitled "POINT OF SALE DEVICE LEVERAGING A PAYMENT UNIFICATION SERVICE".

BACKGROUND

Many products and services may be provided to users or buyers in locations or situations that require payment automation at the point of sale. In such locations, having a cashier to handle payments may not be feasible or desirable. Thus, a point of sale (PUS) device may automatically accept and handle payments of users/buyers and may also handle dispensing or providing the product or service to the user/buyer. Example POS devices include vending machines (e.g., that dispense beverages and snacks), pay-for-use printers, network access points (e.g., that provide WiFi access to users), movie rental kiosks, and parking kiosks, Some POS devices may accept and handle cash as a form of payment. Some POS devices may accept and handle credit cards, debit cards and the like.

Sellers that sell products and services via POS devices are often selling smaller products and services, often for a small price. In some situations, a seller may sell products and services for a very small price, e.g., referred to as a "micro-transaction." Micro transactions may range in price, for example, from a couple of dollars down to one cent ($0.01). Such sellers may depend on a very large number of transactions to make a profit. Various sellers (and POS devices) may require payment in cash, for example, because the profit made by the seller on each transaction is not enough to overcome transaction fees incurred for credit card payments and the like.

Various online users (e.g., buyers and sellers) may use various payment services (e.g., Paypal) to make the process of paying for goods and services online easier and more secure. Such payments services may allow a user, after the user registers with the service, to store payment information (e.g., credit card information), and then the user may transfer money to other users of the same payment service.

BRIEF DESCRIPTION OF THE DRAWINGS

The following detailed description references the drawings, wherein.

DETAILED DESCRIPTION

Figure 1A:
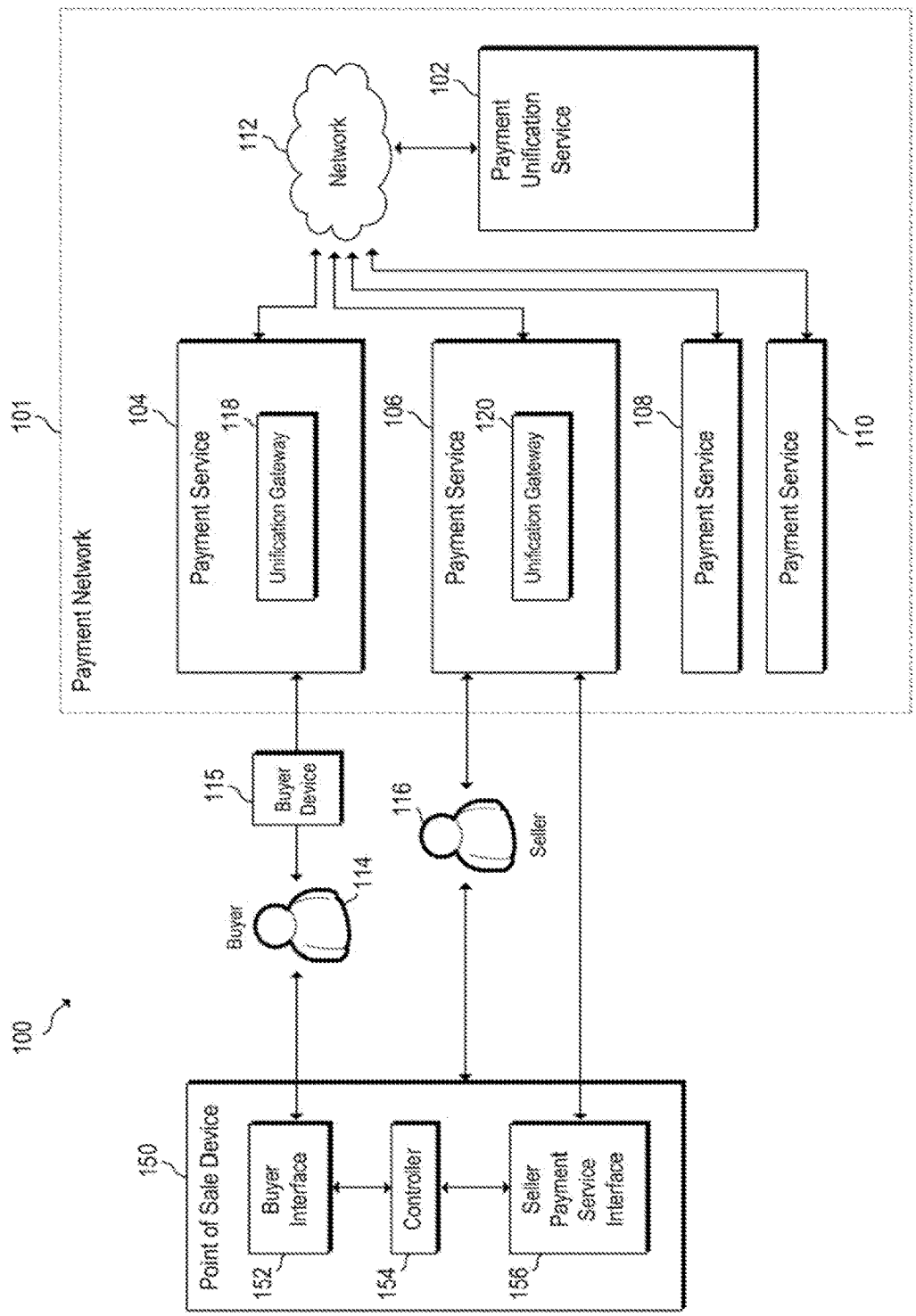
FIG. 1A is a block diagram of an example network setup where a point of sale device may leverage a payment unification service.

When individuals are at various locations (e.g., public locations such as streets, stores, airports, etc.), they may have access to various point of sale (POS) devices that dispense or provide products and/or services. As mentioned above, various sellers (and POS devices) may require payment in cash, for example, because the profit made by the seller on each transaction is not enough to overcome transaction fees incurred for credit card payments and the like. The financial infrastructure to process transactions with credit cards and debit cards is designed to process larger payments, e.g., large compared to the small or micro transactions described above. The cost (e.g., fees) to process very small transactions using traditional solutions, like credit cards, may even be higher than the transaction amount itself, making such solutions economically not viable. As a consequence sellers may be unable to implement a business model that depends on very small prices and a high volume of transactions. If sellers implement a cash-only business model, they may save on transaction fees, but they may lose out on potential buyers that may only purchase goods/services if they can conveniently use their credit card or some other payment method. Additionally, various POS devices (e.g., vending machines) may be vulnerable to tampering, for example, with the use of fake credit card readers and the like.

Also mentioned above, various online users (e.g., buyers and sellers) may use various payment services (e.g., Paypal) to make the process of paying for goods and services online easier and more secure. In some POS devices, such payment services may be supported; however, in these situations, the buyer and the seller must register for the same payment system. Many buyers may be dissuaded from participating because they do not want to go through the hassle of registering for the same payment service used by the seller. Buyers may, for example, dislike using multiple payment services to interact with multiple sellers. Not only may the buyers need to register for each of these payment services, but they may also need to share their financial information (e.g., credit cards, bank account information, etc.) with each service. Buyers may not like the idea of having to trust multiple payment services to keep their important information secure. These hassles of registering for and setting up multiple payment services may act as a barrier that limits the number of buyers that may participate in a seller's micro-transaction business.

Additionally, such payment services are still designed to process larger payments, and the cost (e.g., fees) may still make micro-transactions not viable. Some payment services provide solutions to lower transaction fees for smaller transactions. These payment services may reduce the cost of processing smaller transactions, but such services may still charge fees that are too high to implement a business model that relies on very small transactions (e.g., between 5 cents and one cent) and a very high volume of transactions. Such services have been unable to allow a "critical mass" of buyers to participate (e.g., because of the registration barriers described above), and thus, a sufficient transaction volume cannot be realized to make such a business model viable.

The present disclosure describes a point of sale (POS) device that leverages a payment unification service. The point of sale device may be in communication with a payment network that includes multiple different payment services and the payment unification service. The payment unification service may allow the different payment services to communicate with each other, thereby allowing users (e.g., buyers and sellers) to use only their preferred payment service. The payment unification service may also allow buyers and sellers to remain anonymous or semi-anonymous vis-à-vis each other, which may maintain the benefits of a cash transaction (e.g., anonymity). Still, the present disclosure provides an easy way for buyers to purchase products and services without the hassle of having cash or even credit cards on hand. Because users (e.g., buyers) need not register with a new payment service simply to transact with a seller, and because buyers need not have cash on hand, the registration and usage barriers of previous payment systems are reduced or eliminated. Thus, sellers with micro-payment business models may be able to reach a critical mass of buyers.

The present disclosure also describes aggregation of authorized transactions (e.g., into a single money transfer) and aggregation of payment and billing to users. This may allow for several micro transactions to take place without fees actually being imposed (e.g., fees are deferred). Then, when several authorized transactions have taken place, an actual money transfer may occur. The fee for the actual money transfer may be distributed across the authorized transactions, which may allow for a very low average per-transaction fee. Thus, micro transactions may be viable. It should be understood that the solutions described herein may also be used for larger transactions, and thus, the descriptions provided herein are not limited to micro-transactions.

FIG. 1A is a block diagram of an example ne work setup 100 where a point of sale (POS) device may leverage a payment unification service. Network setup 100 may include a payment network 101. Network setup 100 may include a point of sale (POS) device 150. As can be seen in FIG. 1A, at least one buyer (e.g., 114) may communicate with POS device 150 and with payment network 101 (e.g., via a buyer device 115). Likewise, at least one seller (e.g., 116) may communicate with POS device 150 and with payment network 101 (e.g., via a computing device). POS device 150 may communicate with payment network 101 for example, specifically, with payment service 106.

Point of sale (POS) device 150 may be any kind, of device that automatically receives and handles payment from buyers and/or automatically provides products and services to buyers. POS device 150 may be, for example, a standalone device that physically stores and dispenses products, e.g., a vending machine, movie rental kiosk, etc. Alternatively, POS device 150 may be a device that provides services, for example, a pay-for-use printer, copier, network access point that provides WiFi access or the like. As another example, POS device 150 may be a payment device at a counter in a physical store, where a human cashier may review the products being purchased, but where the payment device handles payment from the buyer. Various other POS devices are available and may benefit from the solutions of the present disclosure. POS device 150 may include a buyer interface 152, a controller 154 and a seller payment service interface 156.

Buyer interface 152 may allow a buyer (e.g., 114) to communicate with POS device 150 such that the buyer can purchase a product or service. For example, buyer interface 152 may include a display screen, touchscreen, button pad and/or various other components used to display information to a user and receive input from a user. In one specific example, buyer interface 152 may be a touchscreen that allows a user to browse through the various products and/or services provided by POS device 150. The buyer may identify a product or service that the buyer desires to purchase. Buyer interface 152 may then allow the user to initiate a purchase process (i.e., submit a purchase request) with respect to the particular product or service. Buyer 114 may, for example, select a "buy" or "checkout" button displayed on the buyer interface 152. Buyer interface 152 may then communicate with controller 154 to continue the purchase process. Buyer interface 152 may allow a buyer (e.g., 114) to enter a user identifier or buyer identifier (e.g., an email address, phone number, account number, temporary account number, etc.) to initiate a purchase process. Buyer identifiers may be described in more detail below, for example, with respect to the gateway directory of payment unification service 102. In some examples, the buyer (e.g., 114) may be local to (e.g., near or close to) the POS device 150. For example the buyer may be within a defined proximity of the POS device, e.g., close enough to touch and/or see POS device 150.

Controller 154 may represent a general controller of the POS device 150. Controller 154 may include a microprocessor, circuitry, a machine-readable storage medium for storing instructions executable by the microprocessor and/or other electronic components. Controller 154 may communicate with other components of POS device 150, and may manage various operations that allow buyers to pay for products and/or services and that allow products/services to be provided to buyers. Controller 154 may support buyer interface 152. For example, controller 154 may maintain an inventory of products and/or services provided by POS device 150 along with information about each product/service (e.g., purchase price, product name and details, etc.). Controller 154 may communicate with buyer interface 152 to provide such information about products and services. Controller 154 may receive transaction initiation signals from buyer interface 152, where each transaction initiation signal is based on a purchase request submitted by a buyer. Each transaction initiation signal indicates that the buyer is interested in paying for and receiving a particular product or service. As described further herein, the purchase request and the transaction initiation signal may each include a user identifier that may be used to identify the buyer (e.g., an identifier entered by buyer 114 via buyer interface 152). Once a transaction has been initiated, controller 154 may communicate with seller payment service interface 156 to in turn communicate with a payment service (e.g., 106) and unification gateway (e.g., 120) used by the seller. POS device 150 may store information regarding which payment services are used by various sellers. The user identifier entered by the buyer may be passed along from buyer interface 152 to controller 154 to payment service interface 156 to payment service 106 and unification gateway 120.

Controller 154 may also cause products and/or services to be provided or dispensed to buyers. Eventually, as described in more detail below, payment service 106 may communicate a transaction authorization back to seller payment service interface 156. The authorization may then be passed along to controller 154. In response, controller 154 may access the relevant product and/or service, and may provide it to the user (e.g., digitally, physically, etc.), for example, via buyer interface 152. If the products are digital (e.g., MP3s), controller 154 may cause a digital MP3 file to be sent (e.g., via a network or buyer interface 152) to the user. Alternatively, if the products are physical (e.g., a bag of chips), controller 154 may cause a mechanical arm, wheel, or other dispensing mechanism to dispense the product to the user.

Seller payment service interface 156 may communicate with at least one payment service used by at least one seller that provides products and/or services via POS device 150. In some examples, seller payment service interface 156 may communicate with multiple payment services, e.g., to support payment services preferred by various sellers that use POS device 150. Seller payment service 156 may send (e.g., via a network such as the internet) a transaction initiation signal, to payment service 106, and in turn to unification gateway 120, where payment service 106 may be the preferred payment service used by the seller of the products/services requested by the purchase request. The transaction initiation signal may be sent in response to a purchase request entered by buyer 114 via buyer interface 152. The transaction initiation signal may include the user identifier of the buyer.

Seller payment service interface 156 may handle authenticating the POS device with the payment network 101 (e.g., with unification gateway 120). Each POS device that communicates with the payment network may have to authenticate itself, for example, by providing a secret code or key. The secret code or key may have been established (e.g., by a seller or owner of the POS device) during a registration process or the like. By providing a secret code or key, the POS device is essentially logging into the unification gateway in a manner similar to how a user may log into the user's preferred payment system. POS device authentication allows the unification gateways (e.g., 120) to be confident they are communicating with devices that are allowed to communicate with the payment network.

Buyer device 115 may be used by buyer 114 to authorize various transactions that are initiated via buyer interface 152. For example, buyer device 115 may receive (e.g., via a network such as the internet) a transaction authorization request from unification gateway 118 associated with payment service 104 of buyer 114. Buyer device 115 may prompt a user that a transaction approval request is waiting for the buyer's approval. This prompt may be via a voice call, a text/SMS message, a dedicated application running on the buyer device, or via a web interface on the device. Buyer device 115 may allow the buyer 114 to interact with the buyer device to review transaction authorization requests and to authorize or cancel the transactions. The buyer device 115 may send an authorization response to unification gateway 118. The authorization response may be generated in response to the buyer interacting with the buyer device 115 to approve a transaction.

In some examples, the buyer device 115 may be separate from the POS device 150 as shown in FIG. 1A. In these examples, buyer device 115 may be a mobile device (e.g., a cell phone, smart phone, tablet, etc.). In these examples, the process of the buyer authorizing a transaction may also include the buyer proving that the buyer 114 and/or buyer device 115 are located near (e.g., within a defined proximity of) POS device 150. For example, an application on the buyer device 115 may confirm that the GPS location of the buyer device 115 is near the GPS location of the POS device 150. As another example, an application on the buyer device 115 may receive and confirm a short-distance wireless signal (e.g., NFC signal) from the POS device 150, which may prove proximity. As another example, POS device 150 may display a confirmation code of sorts, and buyer 114 may enter the code into the buyer device 115, which may confirm proximity.

Figure 1B:
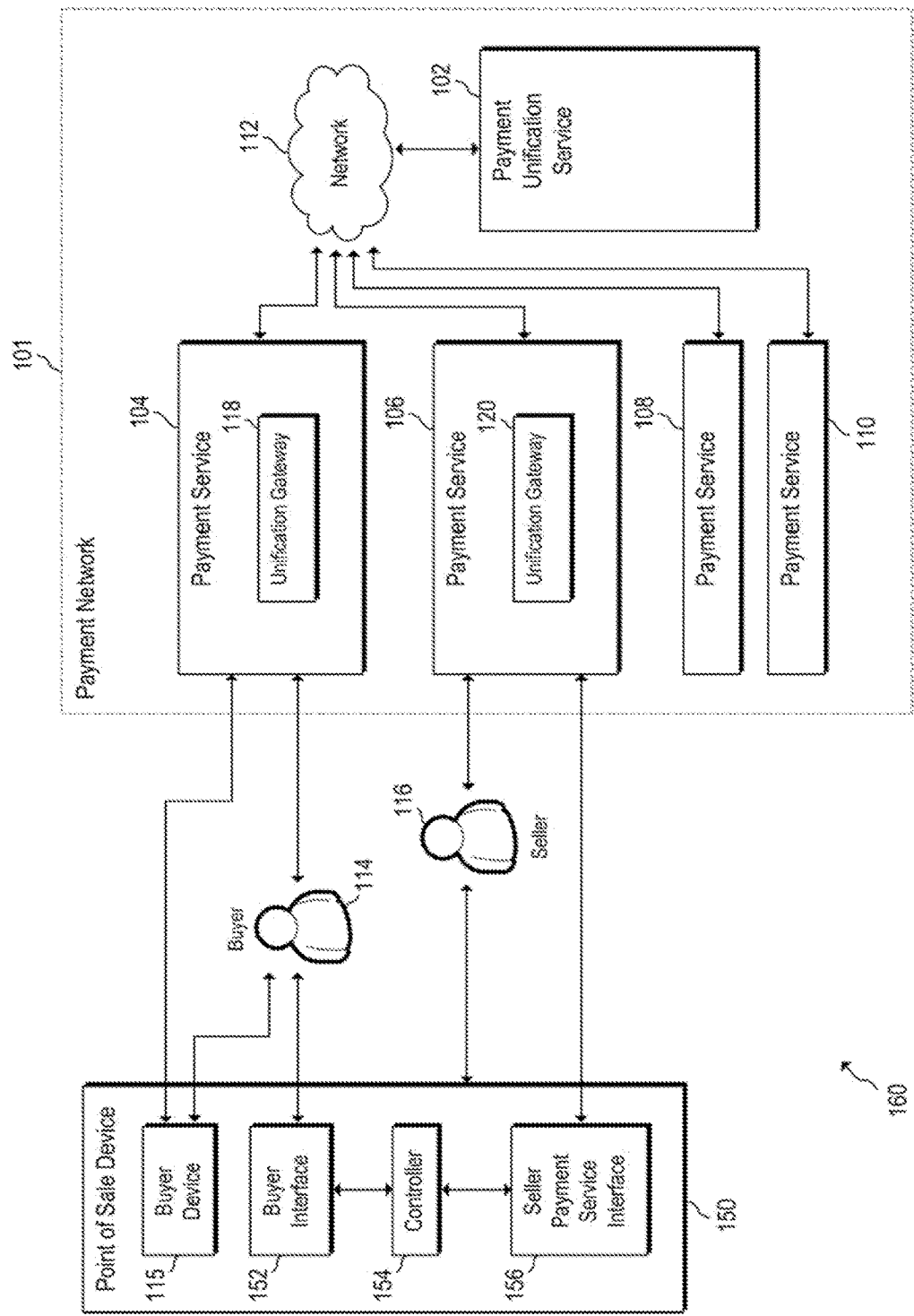
FIG. 1B is a block diagram of an example network setup where a point of sale device may leverage a payment unification service.

In some examples, buyer device 115 may be embedded into or physically connected to POS device 150. FIG. 1B is a block diagram of an alternate example network setup 160, where the components of network setup 160 are similar to the components of network setup 100. As can be seen in FIG. 1B, buyer device 115 is located in POS device 150. For example, buyer device may be mounted in POS device 115 such that a screen of buyer device 115 is exposed to users (e.g., to buyer 114). The buyer device 115 of FIG. 1B may operate in a similar manner to that described with regard to FIG. 1A. In the example of FIG. 1B, a buyer at POS device 150 may have to log in or otherwise identify and authenticate itself to buyer device 115. When the buyer device is a smart phone (for example) that the buyer carries around (e.g., as depicted in FIG. 1A), the buyer may be constantly "logged in" to the smart phone. But, when the buyer device is embedded into the POS device (FIG. 1B), multiple buyers may use the same buyer device 115, and thus, a log in may be required. As an example, if the buyer 114 reviews and approves a transaction authorization requests via email, the buyer may have to log into the buyer's email, and likewise if the buyer uses and application to review and approve. Various forms of quick authentication (e.g., username/password, fingerprint, other biometric input, etc.) may be used such that buyers may quickly log in, review transaction authorization requests and approve transactions.

Payment network 101 may include a number of payment services (e.g., 104, 106, 108, 110) and a payment unification service 102. Payment services (e.g., 104, 106, 108, 110) may each be in communication with payment unification service 102, for example, via at least one network (e.g., 112). Network 112 may be any wired and/or wireless network, and may include any number of hubs, routers, switches or the like. Network 112 may be, for example, part of the internet, at least one intranet and/or other type(s) of network(s). In some examples, different payment services may communicate with payment unification service via different networks, even though FIGS. 1A and 1B show the payment services being connected via the same network 112.

Payment unification service 102 may allow users (e.g., buyers and sellers) to easily transact with each other even if the users are registered with different payment services. The payment unification service 102 may communicate (via the unification gateways) with multiple payment services. The payment unification service along with the unification gateways may allow the multiple payment services to transact with each other. The payment unification service 102 may allow buyers and sellers to remain anonymous or semi-anonymous vis-a-vis each other, as described in more detail below.

Payment unification service 102 may be implemented as at least one computing device, for example, any computing device accessible to payment services (e.g., 104, 106, 108, 110) over the Internet or some other network (e.g., 112). In some examples, payment unification service 102 may be implemented as more than one computing device, for example, computing devices that are in communication with each other (e.g., via a network). In these examples, the computing devices may operate together and provide a coordinated service. In these examples, the computing devices may be separate devices, perhaps geographically separate. The terms "system" and "service" may be used to refer to a computing environment that includes one computing device or more than one computing device.

Each payment service (e.g., 104, 106, 108, 110) may allow users (e.g., buyers and/or sellers) to communicate (e.g., via the Internet or some other network and a web browser or application) with the payment service. For example, buyer 114 may communicate with payment service 104 and seller 116 may communicate with payment service 106. Various example payment services may allow just buyers or just sellers or buyers and sellers to establish accounts and use such a payment service to send and/or receive money (e.g., digital representations of money). The term "buyer" may refer to an individual or organization that is interacting with a POS device (e.g., 150) to purchase a product or service. The term "seller" may refer to an individual or organization that provides a product or service via a POS device (e.g., 150).

Each payment service (e.g., 104, 106, 108, 110) may be implemented as at least one computing device, for example, any computing device accessible to users (e.g., buyers and/or sellers) over the Internet or some other network. In some examples, at least one of the payment services may be implemented as more than one computing device, for example, computing devices that are in communication with each other (e.g., via a network). In these examples, the computing devices may operate together and provide a coordinated service to users. In these examples, the computing devices may be separate devices, perhaps geographically separate. The terms "system" and "service" may be used to refer to a computing environment that includes one computing device or more than one computing device.

Each payment service (e.g., 104, 106, 108, 110) may include a unification gateway (e.g., 118, 120). Payment services 108 and 110 may each include a unification gateway even though such gateways are not shown in FIG. 1A. These unification gateways may allow buyers and sellers to use their existing payment services. Each unification gateway (e.g., 118, 120) may allow the associated payment service to communicate with payment unification service 102. Via these unification gateways and via payment unification service 102, various payment services (e.g., 104 and 106) may conduct transactions and may transfer money between themselves on behalf of buyers and sellers (e.g., 114, 116). Such transactions and transfers may essentially be a negotiation between the gateways (e.g., 118, 120), not a direct negotiation between, the buyer (e.g., buyer's account) and the seller (e.g., seller's account). Buyers and sellers may be authenticated by the particular payment service (and perhaps the unification gateway) used by the buyer or seller. Thus, a buyer may not need to be authenticated by the payment service or unification gateway of the seller, and vice versa. Buyers and sellers (and/or their payment services) may trust the payment unification service, for example, to only allow other reputable and trustworthy payment services to participate in the payment unification service. Thus, buyers and sellers (and/or their payment services) may not need to directly trust or authenticate each other.

In order for a payment service to benefit from the payment unification service 102, the payment service may need to install, run, connect to and/or support a unification gateway. Unification gateways (e.g., 118, 120) may be, for example, designed and provided by the same organization that maintains payment unification service 102. Such an organization may provide or publish unification gateways (e.g., as HTML, JavaScript or other code), and then payment services may download, receive, install and/or run such a unification gateway as part of the payment service. As one specific example, at least one computing device of payment unification service 102 may stare executable unification gateway code that may be downloaded by various payment services. In order to install or run such a unification gateway, the payment service may link various aspects of the unification gateway (e.g., an account manager) to related aspect of the payment service (e.g., user accounts) to allow for proper communication. In some examples, at least one payment service (e.g., 104, 106, 108, 110) may be hosted or run by the same organization that maintains payment unification service 102, in which case, the organization may add a payment gateway to the payment service. Unification gateways may be described in more detail below, in some examples, at least one unification gateway may be implemented partially on the payment service side and partially on the payment unification service side (e.g., with portions of code running on each side).

Each payment service (e.g., payment service 106 of seller 116) may allow at least one POS device (e.g., 150) to communicate with the payment service, for example, to indicate that a seller (e.g., 116) desires to get paid for a product and/or service. Payment service 106 may then communicate (e.g., via unification gateway 120) with payment unification service 102 to determine how to connect to the buyer's unification gateway (e.g., 118), to request payment from the payment service used by the buyer (e.g., 104). As described in more detail below, payment service 104 (e.g., via unification gateway 118), for example, with authorization from user 114, may indicate to payment service 106 that payment will be sent (e.g., eventually after aggregation) and that the transaction is authorized. Payment service 106 may then communicate with POS device 150 to indicate that the transaction is authorized (e.g., sending a transaction authorization), and as a result, POS device 150 may provide the product and/or service to buyer 114.

The above example operational description illustrates one example benefit of the present disclosure. With various payment services, in order for a buyer to transfer money to a seller, the buyer may have to register for the same payment service used by the seller. Thus, in the example described above, buyer 114 may have to register (e.g., and share financial and other sensitive information) with payment service 106, even though buyer 114 may already have an account with payment service 104. Buyer 114 may prefer using payment service 104 and may only trust payment service 104. Instead, the present disclosure describes a payment unification service 102 that allows users (e.g., buyers and sellers) to use their existing and/or preferred payment services. Buyer 114 may continue to share the buyer's sensitive information (e.g., billing information) only with the payment service that the buyer trusts. Likewise, seller 116 may use the payment service (e.g., 106) that the seller trusts. Thus, buyers and sellers need only establish a relationship with whatever single payment service the buyers/sellers trust, and buyers are not required to establish a relationship with the payment service of the seller or the seller itself.

Payment unification service 102 may include a gateway interface which may allow payment unification service 102 to communicate with multiple unification gateways (e.g., 118, 120) respectively associated with multiple payment services (e.g., 104, 106, 108, 110) The gateway interface may for example, receive gateway lookup requests from unifications gateways. The gateway interface may then communicate with a gateway directory (described more below) to perform such a gateway lookup and may return lookup results to the requesting unification gateways. The gateway interface may also receive transaction logging information from the various unification gateways, and may send such logging information to another component of the payment unification system for storage.

Payment unification service 102 may include a gateway directory, which may store and/or maintain a list of trusted gateways. Each unification gateway (e.g., 118, 120, etc.) that is provided (e.g., to various payment services) by payment unification service 120 may have an associated gateway identifier (e.g., numbers and/or letters). Each unification gateway may also be associated with particular gateway connection information (e.g., URL, network address, etc.) that allows other unification gateways to connect to the unification gateway. Thus, the gateway directory may maintain a list of gateway identifiers and/or gateway connection information for trusted gateways. Each unification gateway may be associated with a particular payment service. The gateway directory may store which payment service is associated with each payment gateway; however, it may be unnecessary to store the payment services associated with the gateways. For example, payment unification service may treat each payment service as a black box, and may not care about precisely how the payment service works as long as the payment service includes and/or supports a unification gateway.

The gateway directory may maintain a list of users (e.g., buyers and/or sellers). Users may be indicated in the gateway directory by a user identifier (e.g., an email address, phone number, account number, temporary account number, etc.). The term "user identifier" may be a more general term that may cover either a buyer identifier or a seller identifier. Each user identifier in the gateway directory may be unique, in which case, each user identifier may uniquely identify a particular user (e.g., buyer 114). User identifiers may identify users regardless of the payment service that the users are associated with. Thus, if a particular user has accounts with multiple payment services, care may be taken to ensure that each unique user may be associated with a particular unification gateway (e.g., and payment service). For example, if a user registers with two payment services, using the same email address as an identifying piece of information, then that email address alone may not, at least alone, serve as a useful user identifier in the gateway directory. In such a case, a different user identifier may be used, or an additional piece of user identification information may be stored in the gateway directory.

In one particular example, when a user is registered with or introduced to the payment unification service 102, a unique user identifier may have to be provided. During such registration or introduction, the gateway directory may check that such a user identifier is not already in use. If it is, a different user identifier may have to be provided in order to register or introduce the user. The decision of which user identifier is used for a particular user may be made by the user or automatically on the user's behalf (e.g., by the payment service or the unification gateway). As may be described in more detail herein, the user may later use the user identifier to make purchases (e.g., via buyer interface 152). More information about user identifiers may be described below with regard to account manager module 304 of FIG. 3, which may describe how users are registered with, introduced to and/or tracked in the payment unification service 102.

The gateway directory may maintain, for each unique user identifier, an associated gateway (e.g., gateway identifier, gateway connection information, etc.), which may be associated with the payment service used by the user. In other words, the gateway directory may maintain a number of user identifier/gateway pairs. Each particular pair may only be maintained by the gateway directory if the gateway is trusted, e.g., in the list of trusted gateways. The gateway directory may perform gateway lookups. A gateway lookup request may include a user identifier (e.g., email address, phone number, account number, temporary account number, etc.), for example, the user identifier of the buyer (e.g., 114) requesting a product or service. The gateway directory may then determine the gateway (e.g., gateway identifier, gateway connection information, etc.) associated with the user identifier, and may return the gateway (e.g., gateway connection information) to the gateway interface, to in turn be returned to the requesting unification gateway. The requesting unification gateway may then use the returned information to connect to the buyer's unification gateway.

Payment unification service 102 may include a transaction aggregator, which may allow for several small (i.e., micro) authorized transactions to be aggregated into a single money transfer between unification gateways. By using the transaction aggregator, payment unification service 102 may allow various small transactions to be authorized, while refraining from indicating that a money transfer should take place between the involved unification gateways. When a transaction is authorized, payment services (e.g., 104, 106) may allow the buyer (e.g., 114) to receive the product or service offered by the seller (e.g., 116); however, money may not actually transfer from the buyer's payment service to the seller's payment service. When the transaction aggregator determines that a money transfer should occur, money may actually transfer from the buyer's payment service to the seller's payment service. More particularly, when a number of small transactions have been authorized (e.g., between two particular payment services), the transaction aggregator may indicate that a money transfer should occur (e.g., between the same two payment services), where the money transfer amount may essentially be the sum of the small transaction amounts. Because, for many payment services, fees are only imposed when money is actually transferred, this aggregation of transactions reduces the average cost for small transactions. The seller's payment service may not actually get paid until a money transfer occurs; however, payment services may know that money for authorized transactions is owed/promised to them, and payment services may trust (e.g., trust payment unification service and other participating payment services) that payment will come eventually.

It should be understood that various transactions (e.g., between two particular payment services) may be aggregated (e.g., into a single money transfer), even if the transactions are between various users (i.e., not always between the same seller and buyer). Instead, in order to be aggregated, transactions may only need to occur between the same payment services (e.g., between the same unification gateways). It may be the case that the payment unification service described herein may be used with payment services that experience a high volume of transactions consistently over time. Thus, it may be expected that any two of the participating payment services (e.g., unification gateways) will communicate frequently such that transaction aggregation can occur.

The transaction aggregator may keep track of transaction aggregations for various payment service pairs. For example, for payment services 104 and 106, the transaction aggregator may keep track of a dollar amount of aggregated transactions that have occurred since the last time a money transfer occurred between the same two payment services. While the aggregated dollar amount is below a defined threshold, the transaction aggregator may simply indicate that transactions between payment services 104 and 106 should be authorized. When the aggregated dollar amount reaches the defined threshold, the transaction aggregator may indicate that a money transfer should occur between the payment services, where the transfer amount may essentially be the sum of the aggregated authorized transaction amounts. As another example, the transaction aggregator may indicate that a money transfer should occur between the payment services once per each defined period of time (e.g., every week, month, etc.). The defined threshold and/or the defined period of time may be set in various ways. For example, the threshold/period may be configured by a system administrator of the payment unification service. The defined threshold/period may be determined based on various factors, for example, an agreement between various participating payment services.

Payment to sellers and billing of buyers may be aggregated in a similar manner to how transactions may be aggregated (as described above). This may reduce any transactions fees imposed between users' external banking systems and users' payment services. More details about aggregation of payment and billing may be described in more detail below.

Figure 2A:
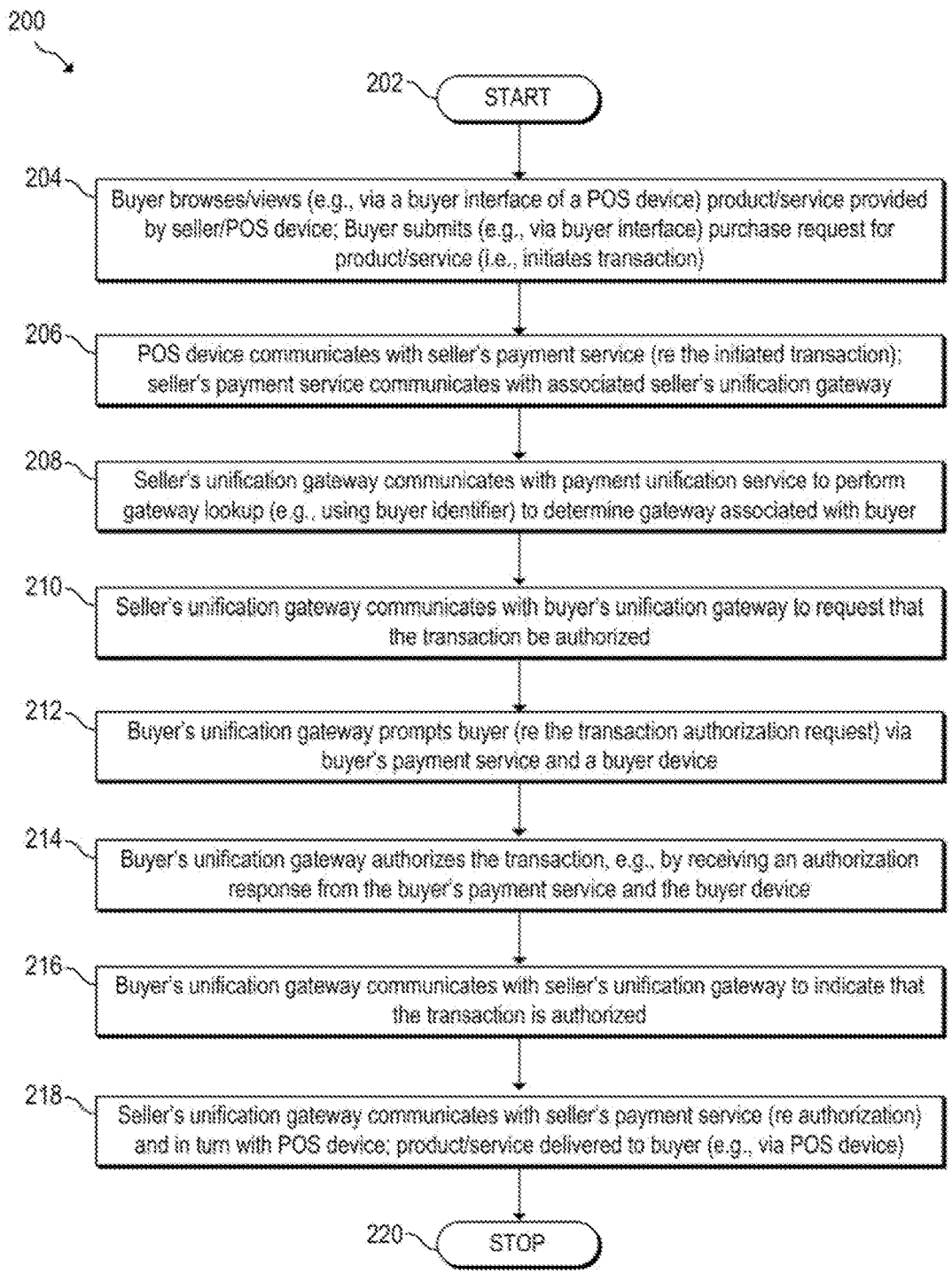
FIG. 2A is a flowchart of an example method for a payment unification service that may be used with a point of sale device.
Figure 2B:
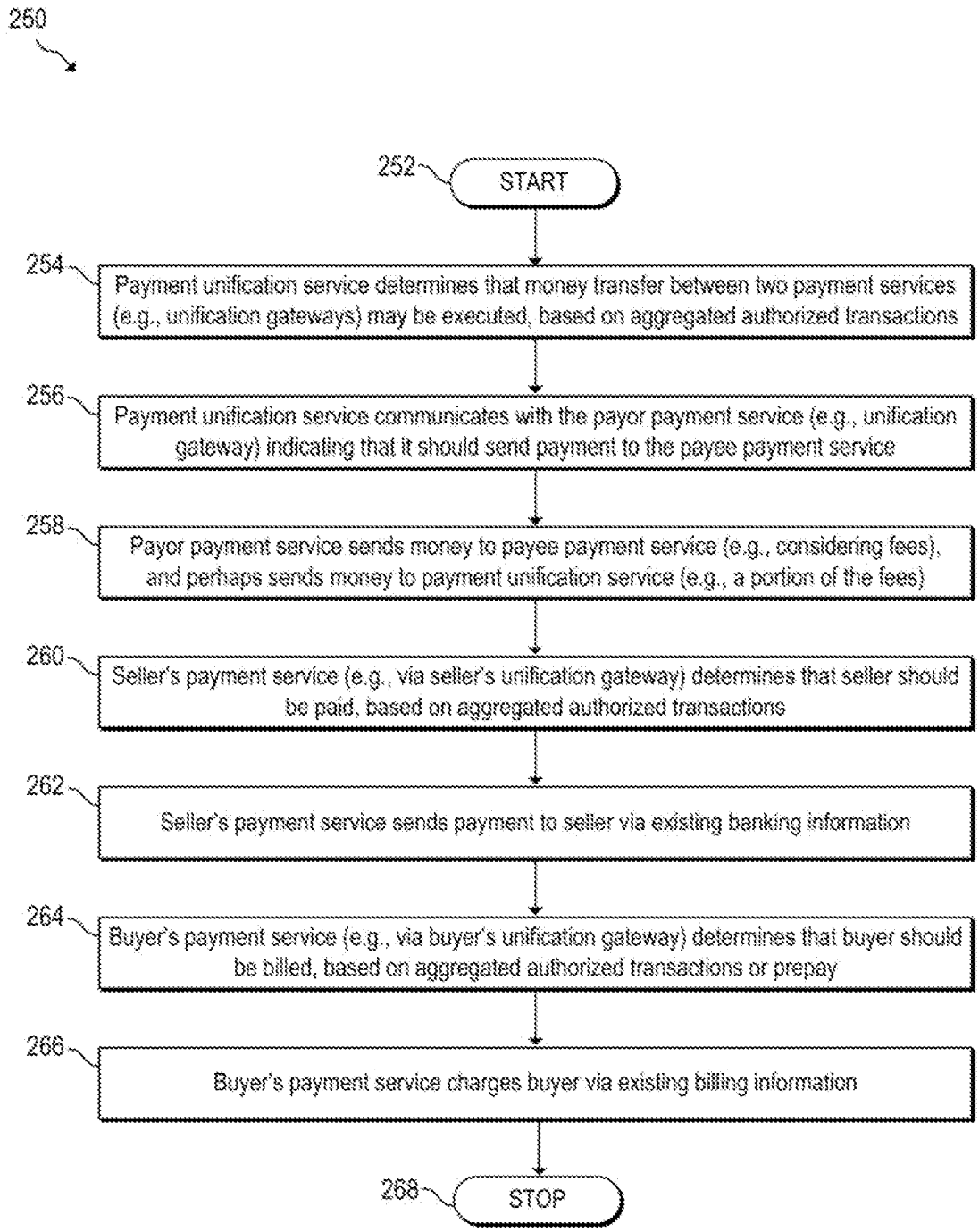
FIG. 2B is a flowchart of an example method for a payment unification service that may be used with a point of sale device.

FIGS. 2A and 2B depict flowcharts of example methods 200 and 250 for a payment unification service that may be used with a point of sale (POS) device. Various steps of methods 200, 250 may be executed in various places, for example, in the seller's payment service, in the seller's unification gateway, in the buyer's payment service, in the buyer's unification gateway, in the payment unification service and/or in the POS device. The steps of methods 200, 250 may be implemented in the form of executable instructions stored on at least one machine-readable storage medium. In some situations, various instructions that may, in the future, be executed in various places, may first be stored on a machine-readable storage medium in the payment unification service/system before being distributed or while being offered for download or access. In addition or as an alternative, the steps of methods 200, 250 may be implemented using at least one hardware device that includes electronic circuitry for implementing the functionality described below. In alternate embodiments of the present disclosure, one or more steps of methods 200, 250 may be executed substantially concurrently or in a different order than shown in FIGS. 2A and 2B. In alternate embodiments of the present disclosure, methods 200, 250 may include more or less steps than are shown in FIGS. 2A and 2B. In some embodiments, one or more of the steps of methods 200, 250 may, at certain times, be ongoing and/or may repeat.

Method 200 may start at step 202 and continue to step 204, where a buyer (e.g., 114 of FIG. 1) may browse/view (e.g., by interacting with a buyer interface 152 of a POS device 150) a product or service provided by a seller (e.g., 116) via the POS device. The buyer may purchase the product or service (i.e., submit a purchase request) by interacting with the POS device (e.g., with the buyer interface). This may initiate a transaction between the buyer and the seller. At step 206, the POS device (e.g., via a seller payment service interface 156) may communicate with the seller's payment service (e.g., 106), which in turn may communicate with an associated unification gateway (e.g., 120). The POS device may have to authenticate itself with the seller's payment service, e.g., by using a secret code or key as described above. At step 208, the seller's unification gateway may communicate with a payment unification service (e.g., 102) to perform a gateway lookup to determine a unification gateway associated with the buyer. The gateway lookup may include a user/buyer identifier provided by the buyer when the buyer requested that the purchase be initiated. At step 210, the seller's unification gateway may communicate with the buyer's unification gateway (e.g., 118) to request that the transaction be authorized. This transaction request is performed between the unification gateways, and does not require the buyer to establish a relationship with the seller or the seller's payment service.

At step 212, the buyer's unification gateway (e.g., 118) may prompt the buyer (e.g., 114) regarding the transaction authorization request. The buyer may be prompted for approval via the buyer's payment service (e.g., 104) and via a buyer device (e.g., 115), which may be, for example, a smart phone or a device embedded into the POS device. At step 214, the buyer's unification gateway may authorize the transaction, for example, for example, by receiving an authorization response from the buyer's payment service (and the buyer device). The buyer may be also be prompted to prove that the buyer/buyer's device is located near the POS device (e.g., by providing a GPS location or by providing information displayed on the POS device). At step 216, the buyer's unification gateway may communicate with the seller's unification gateway to indicate that the transaction is authorized. At step 218, the seller's unification gateway communicates with the seller's payment service (regarding the authorized transaction) and in turn with the POS device (e.g., with seller payment service interface 156). Then, the POS device may provide or dispense the product or service to the buyer. Method 200 may eventually continue to step 220, where method 200 may stop.

Method 250 may start at step 252 and continue to step 254, where the payment unification service (e.g., 102) determines that a money transfer between two payment services (e.g., unification gateways) may be executed. The money transfer may be based on aggregated authorized transactions, as describe in detail above. The payment service that owes the money may be referred to as the payor payment service, and the payment service that is owed money may be referred to as the payee payment service. At step 256, the payment unification service may communicate with the payer payment service (e.g., with its unification gateway) to indicate that it should send payment to the payee payment service. At step 258, the payor payment service may send money to the payee payment service. Such a money transfer may consider fees due. Payer payment service may also send money to the payment unification service (e.g., if the payment unification service receives a share of the profits).

At step 260, the seller's payment service (e.g., via the seller's unification gateway) may determine that the seller should be paid, for example, based on aggregated authorized transactions. At step 262, the seller's payment service may send payment to the seller, for example, via existing banking information stored in the seller's payment service. At step 264, the buyer's payment service (e.g., via the buyer's unification gateway) may determine that the buyer should be billed, for example, based on aggregated authorized transactions. In some examples, the buyer may prepay. At step 266, the buyer's payment service may charge the buyer, for example, via exiting billing information stored in the buyer's payment service. Method 250 may eventually continue to step 268, where method 250 may stop.

Figure 3:
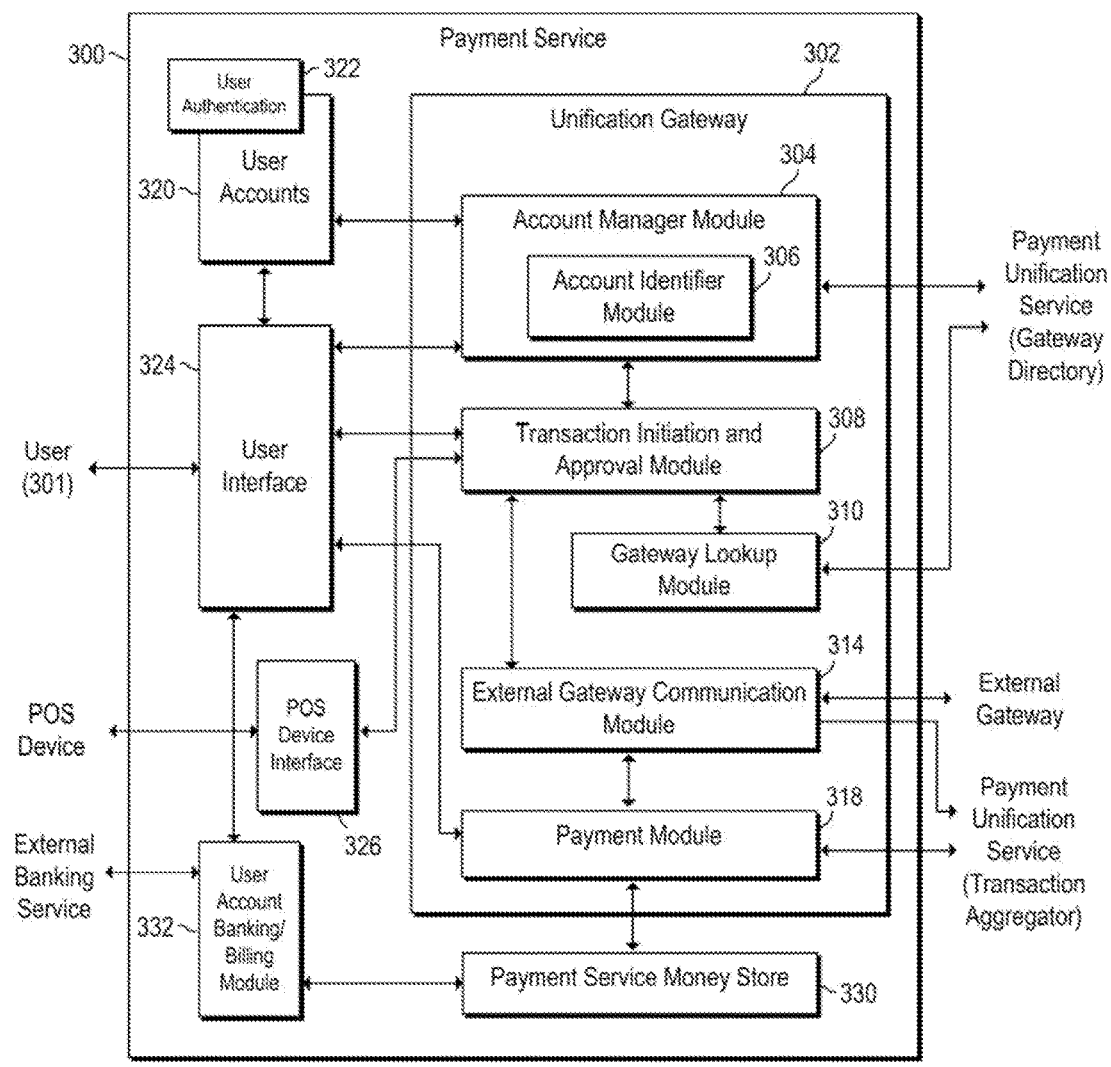
FIG. 3 is a block diagram of an example unification gateway to facilitate a payment unification service.

FIG. 3 depicts a block diagram of an example unification gateway 302 to facilitate a payment unification service. Unification gateway 302 may be similar to unification gateways 118 and 120 of FIGS. 1A and 1B, for example. As depicted in FIG. 3, unification gateway 302 may include a number of modules, for example, modules 304, 306, 308, 310, 314, 318. In some examples, unification gateway 302 may include more or less modules than those shown in FIG. 3. These modules may include a series of instructions encoded on a machine-readable storage medium and executable by at least one processor accessible by payment service 300. In addition or as an alternative, these modules may include one or more hardware devices including electronic circuitry for implementing the functionality described below.

FIG. 3 depicts unification gateway 302 as being implemented in a payment service 300; however, it should, be understood that in other examples, unification gateway 302 may be partially implemented in a payment service and partially implemented in the payment unification service (e.g., 102). FIG. 3 depicts unification gateway 302 as being a general purpose unification gateway that may be used for buyers and/or sellers. In the situation of unification gateway 302 being used by a buyer, various modules of unification gateway 302 may or may not be used, and various modules may operate differently than if unification gateway 302 was being used by a seller. For a buyer, unification gateway 302 may manage transactions on behalf of the buyer. For a seller, unification gateway 302 may manage transaction on behalf of the seller. In some examples, unification gateway 302 may be customized to work for a buyer only or a seller only, in which case various modules may be removed and/or various modules may operate with reduced functionality. Unification gateway 302 may also manage various aspects of transferring money between payment services, as described in more detail below.

Account manager module 304 may identify various users (e.g., user 301) that have accounts with the payment service 300. User 301 may be a buyer in the case of a buyer using unification gateway 302 or a seller in the case of a seller using unification gateway 302. Account manager module 304 may communicate with user accounts 320 of the payment service 300. Payment service 300 may have authenticated (e.g., via user authentication 322) the users associated with various user accounts, for example, by verifying a mailing address, email address, phone number, or by referencing a person information directory. Thus, account manager module 304 may assume that users associated with user accounts 320 are who they say they are. A user's (e.g., 301) registration with a particular payment service (e.g., 300) may be the only registration that a user may need to participate in the payment unification service described herein. A user's registration may include steps of registering or being introduced to the payment unification service, as described below, but the user need not register with another payment service. Once a user is registered with a payment service and introduced to the payment unification service, the user will not have to first register in order to conduct a transaction with a seller that uses a different payment service.

Account manager module 304 may gather various pieces of identifying information about various users, for example, email address, telephone number, etc. These pieces of identifying information may be gathered mainly for account manager module 304 to track users, and this information may not be shared outside of unification gateway 302 (e.g., with other unification gateways). The identity of users outside of unification gateway 302 may be indicated in various ways, as described below with respect to module 306. It should be understood that, in the case of a buyer using unification gateway 302 for example, account manager module 304, and payment service 300 in general, does not store identifying information of the seller, unless the seller voluntarily establishes an account with the same payment service. Thus, unless the seller and buyer happen to register with the same payment service, no unification gateway in a transaction chain between the seller and buyer will store both the buyer's and seller's information. Thus, transaction privacy is maintained.

Account manager module 304 may communicate with a user interface 324 of payment service 300. In this respect, a user may interface with account manager module 304, for example, to modify and/or view the way that account manager module identifies the user.

Account identifier module 306 may determine user identifiers for various users, where for a particular user, the user identifier may be used to participate in a transaction. As one example, account identifier module 306 may simply use a piece of identifying information (e g., email address, phone number, etc.) gathered from user accounts 320 to identify a user. As another example, module 306 may generate a new user identifier (e.g., numbers, letters, etc.) to further preserve the anonymity of the user. The new user identifier may be temporary and may change at various times. For example, a temporary user identifier may be issued per transaction, and/or for a defined period of time, and/or per seller (in the case of a user using unification gateway 302). Various other ways of changing the temporary user identifier may be used. The association between the temporary user identifier and the real user account may be known only to unification gateway 302. Thus, the temporary user identifier does not allow a seller, for example, to collect personal information of a buyer. In some situations, one real user account may be associated with multiple temporary identifiers.

Account identifier module 306 may allow a user to select, input and/or view (e.g., via user interface 324) the user's identifier in module 306. In this respect, the user may be able to stay appraised of the user identifier. Additionally, a user may have control over when and how the user's identifier changes. For example, if a buyer wanted to engage in a transaction with a seller that the buyer did not fully trust, the buyer may change the buyer's identifier to a random number. Likewise, if the buyer trusted the seller, the buyer may use a more convenient identifier, such as an email address. This may ensure full anonymity while avoiding unwanted user authorization requests. Account identifier module 306 may communicate with payment unification service (e.g., gateway directory 124) to ensure that the gateway directory is storing the current identifier for the user.

Account identifier module 306 may communicate with the payment unification service (e.g., whenever a user creates or changes the user's identifier) to check that the user identifier is not already stored in the gateway directory (e.g., 124). The process of account identifier module 306 creating a user identifier and checking to ensure that the identifier is not already used in the gateway directory may be referred to as registering the user with or introducing the user to the payment unification service.

A user (e.g., a buyer) may use the user's identifier when engaging in a transaction. For example, referring to FIGS. 1A and 1B, when buyer 114 is ready to "buy" or "checkout", buyer 114 may provide the user's identifier (e g., via buyer interface 152). This may be the only piece of information that the buyer 114 has to provide in order to initiate the transaction, and eventually to cause payment to be sent to the seller. Once the buyer provides the user identifier, the POS device 150 may eventually send the user identifier to payment service 106 and to unification gateway 120. Unification gateway 120 may then use the user identifier to perform a gateway lookup, as described in more detail herein.

Referring again to FIG. 3, transaction initiation and approval module 308 may, when used by a seller, initiate a transaction, for example, in response to a communication from POS device interface 326, which may communicate with POS device 150 of FIGS. 1A and 1B, for example. The communication from POS device interface 326 may include a user identifier provided by a buyer. Transaction initiation and approval module 308 may send the user identifier to gateway lookup module 310 to determine a unification gateway associated with the buyer. Once module 308 receives (e.g., from module 310) the unification gateway (e.g., a URL or network address) associated with the buyer, module 308 may communicate with gateway authentication module 312 to authenticate the buyer's gateway. If the buyer's gateway is approved, module 308 may establish a connection (e.g., via module 314) with the buyer's unification gateway (e.g., shown as "external gateway" in FIG. 3A) to request authorization of the transaction (e.g., indicating that payment will be sent eventually). When module 308 receives authorization, it may communicate with POS device interface 326 to provide the product or service to the buyer.

Transaction initiation and approval module 308 may, when used by a buyer, receive a transaction authorization request from a seller unification gateway (e.g., via module 314). Module 308 may then determine whether to authorize the transaction. Module 308 may prompt the buyer for approval via user interface 324. User interface 324 may be in communication with a device used by the buyer (e.g., buyer device 115 of FIGS. 1A and 1B). In this scenario, an alert may display on the device of the buyer. Module 308 may then receive an approval response from the buyer and may then indicate (e.g., via module 314) that the transaction is authorized to the seller's unification gateway. In some examples, module 308 may automatically approve some or all transactions of the buyer. Automatic approval may be based on various settings and/or policies, for example, settings in user accounts 320 and/or policies established by payment service 300. Additionally, the authentication method may vary depending on various factors, for example, the type of transaction (e.g., one-time, reoccurring, duration, reserve needed, etc.), the type of user, etc. As one example, a buyer may establish settings for an automatic authorization for a particular seller for transactions that do not exceed, in total, one dollar per week. Such a setting may permit the buyer to engage in many small transactions without having to manually approve each one, and may permit the buyer to engage in frequent transactions with trusted sellers, where certain transactions (e.g., music, streaming video, etc.) happen quickly (e.g., real-time). User settings and polices may be configured to automatically authorize in various other situations.

Gateway lookup module 310 may communicate with the payment unification service (e.g., with gateway directory 124) to perform gateway lookups. For example, once module 308 provides (e.g., from buyer interface 152) a user identifier (e.g., an email address) provided by a buyer, gateway lookup module 310 may send this user identifier to a gateway directory in the payment unification service, and in return may receive a gateway (e.g., a URL or network address) associated with the buyer. Module 310 may then provide the gateway information to module 308. In some examples, unification gateway 302 (e.g., via module 310) may store or cache user identifier/gateway pairs, for example, for common users, important users, etc. In these examples, if module 310 has a hit in its cache, module 310 may not need to contact the gateway directory. In some examples, the buyer and the seller may both use the same payment service, in which case POS device interface 326 and/or module 310 may detect such a scenario and may determine the buyer's gateway without contacting the gateway directory.

External gateway communication module 314 may generally be used to communicate with other unification gateways. For example, in the case of a seller using unification gateway 302, module 314 may send transaction authorization requests to buyer unification gateways and receive transaction authorizations. Additionally in the case of a seller, module 302 may receive money transfers from buyer unification gateways. In the case of a buyer using unification gateway 302, module 314 may receive transaction authorization requests from seller unification gateways and send transaction authorizations. Additionally in the case of a buyer, module 302 may send money transfers to seller unification gateways.

Payment module 318 may communicate with payment unification service (e.g., a transaction aggregator) to receive indications of when money transfers should be made to other unification gateways. Payment module 318 may also handle money transfers sent from other unification gateways. As described above, a transaction aggregator may aggregate multiple authorized transactions and then may indicate to a particular unification gateway that it should transfer money to another payment gateway. In general, the term "payor" or "payor unification gateway" may be used to refer to a unification gateway that owes money to another unification gateway. Likewise, the term "payee" or "payee unification gateway" may be used to refer to a unification gateway that is owed money by another unification gateway.

If unification gateway 302 receives an indication that it should transfer money, module 318 may communicate with payment service money store 330 to access the money. Payment service money store 330 may generally represent a repository of payment service 300 that stores money (e.g., digital representations of money) owned by the payment service. In other words, payment service money store 330 may store the general wealth of the payment service 300. The wealth may be made up of money deposited and received by various users of the payment service. Once payment module 318 accesses the money to be transferred, module 318 may communicate with module 314 to transfer the money, and the amount of money transferred may be debited from payment service money store 330. If unification gateway 302 is owed money, it may receive money via module 314, and then the money may be sent to payment module 318, and in turn to payment service money store 330, in which case money may be credited to store 330.

Payment module 318 may handle aggregation of payments to sellers and billings of buyers as well. Payment module 318 may, in the case of a buyer using unification gateway 302, track money owed by various buyers. Even though a buyer may owe money to the payment service, payment module 318 may cause the payment service to refrain from billing the buyer. Once a defined threshold is met (e.g., a money amount or a time period) for the user, payment module 318 may cause the payment system to bill the buyer, for example, using user account banking/billing information already stored by the payment service (e.g., in module 332). Payment module 318 may communicate directly with module 332, or it may communicate via payment service money store. Either way, module 332 may receive money from the buyer's external banking service and transfer/credit the money to payment service money store 330. In some situations, the buyer may be billed up front, for example, to establish a credit of money in payment service 300, and that amount may be debited over time, instead of aggregated billing.

In the case of a seller, payment module 318 may aggregate payments in a similar manner to billings. Once the amount owed to a particular seller reaches a defined threshold, module 318 may cause (e.g., via store 330) module 332 to send money to the seller's external banking service. Alternatively, payments may be made to sellers at defined intervals (e.g., each week, month, etc.). In some situations, sellers may be able to configure preferences regard the defined interval. In some situations, a seller may, for example, be able to get paid more frequently if the seller is willing to pay a high fee. Sellers may not actually be paid until a money transfer is actually executed. This means that sellers may deliver products and services based on authorized transactions without actually being paid. However, sellers may know that money for authorized transactions is owed/promised to them, and they may trust that they will get paid in the future.

The payment unification service described herein may allow for flexibility in fees. Various other payment services may charge a fixed fee for transactions, which is at least one reason why micro transactions are not feasible with such services. Because the current solution allows for flexibility in when money is transferred, the solution also allows for flexibility regarding the average fee per transaction. For example, if 100 transactions are authorized between two unification gateways before money is actually transferred, the average fee per transaction may be $1/100^{th}$ of fees incurred using other services. In theory, the per-transaction fee may be lowered as much as desired as long as enough transactions can be aggregated in an acceptable amount of time before a money transfer occurs.

Figure 4:
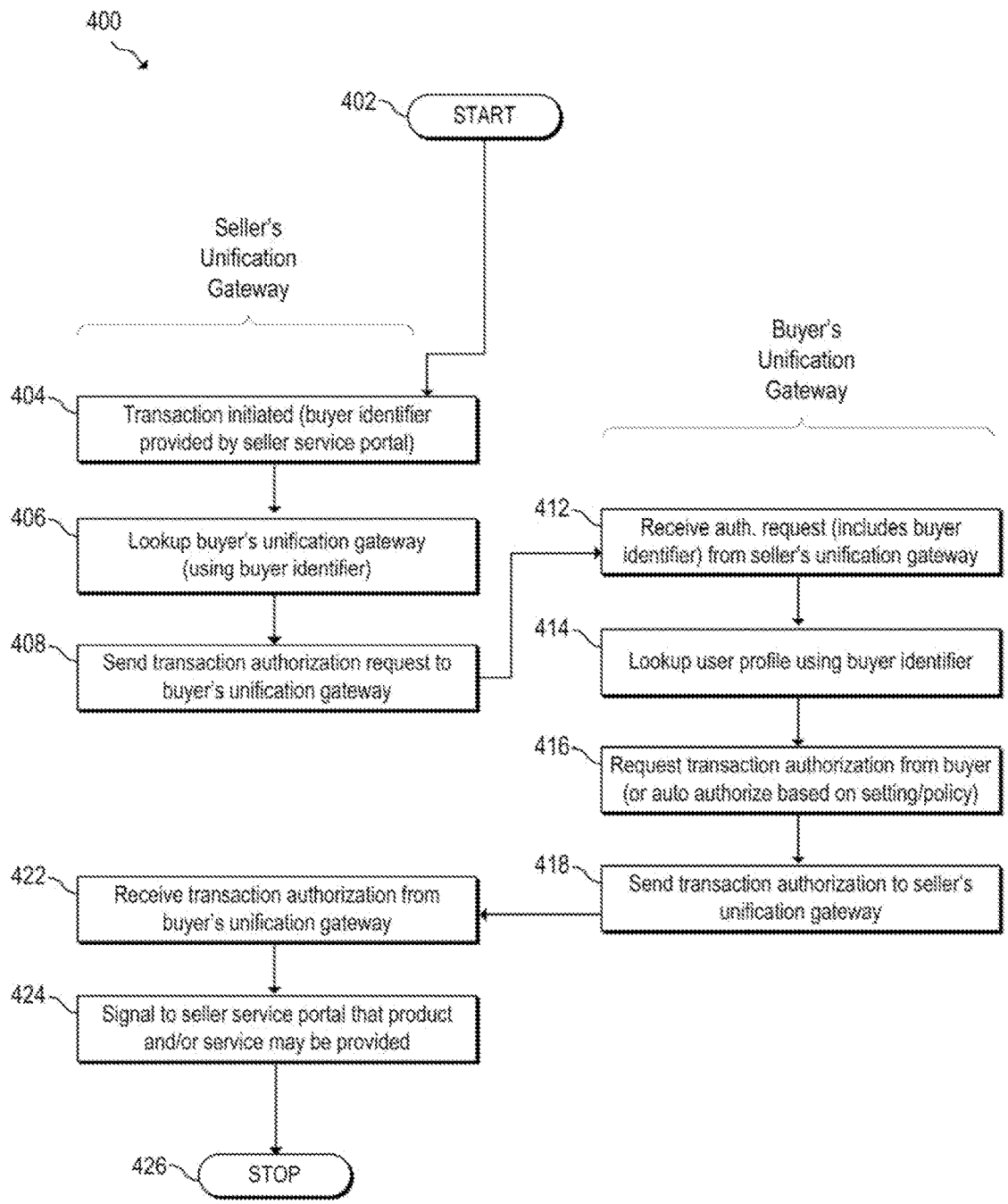
FIG. 4 is a flowchart of an example method for a payment unification service that may be used with a point of sale device.

FIG. 4 depicts a flowchart of an example method 400 for a payment unification service. Various steps of method 400 may be executed in various places, for example, in the seller's payment service, in the seller's unification gateway, in the buyer's payment service, in the buyer's unification gateway, in the payment unification service and/or in the point of service (POS) device. FIG. 4 generally breaks down the steps into steps executed in or near the seller's unification gateway on the left, and steps executed in or near the buyer's unification gateway on the right. It should be understood however that part or all of these steps may have components that are executed in the payment unification service and/or in the POS device. The steps of method 400 may be implemented in the form of executable instructions stored on at least one machine-readable storage medium. In some situations, various instructions that may, in the future, be executed in various places, may first be stored on a machine-readable storage medium in the payment unification service/system before being distributed or while being offered for download or access. In addition or as an alternative, the steps of method 400 may be implemented using at least one hardware device that includes electronic circuitry for implementing the functionality described below. In alternate embodiments of the present disclosure, one or more steps of method 400 may be executed substantially concurrently or in a different order than shown in FIG. 4. In alternate embodiments of the present disclosure, method 400 may include more or less steps than are shown in FIG. 4. In some embodiments, one or more of the steps of method 400 may, at certain times, be ongoing and/or may repeat.

Method 400 may start at step 402 and continue to step 404, where a transaction may be initiated in the seller's unification gateway (e.g., 302), e.g., in response to a transaction initiation signal from the POS device (e.g., received/handled by POS device interface 326 and module 308). The transaction initiation signal may include a buyer identifier (e.g., entered at the POS device by the buyer). At step 406, the seller's unification gateway may communicate with the payment unification service to lookup the buyer's unification gateway. At step 408, the seller's unification gateway may send a transaction authorization request to the buyer's unification gateway (e.g., also generally shown by 302). At step 412, the buyer's unification gateway may receive (e.g., via module 314) the authorization request, for example, including the buyer identifier. At step 414, the buyer's unification gateway may look up (e.g., via module 304) the user profile associated with the buyer identifier. At step 416, the buyer unification gateway may authorize (e.g., via module 308) the transaction, for example, by requesting approval (e.g., via user interface 324 and a buyer device) from the buyer or by automatic authorization (e.g., based on settings and/or policies). At step 418, the buyer's unification gateway may send (e.g., via module 314) the transaction authorization to the seller's unification gateway. At step 422, the seller's unification gateway may receive (e.g., via module 314) the transaction authorization. At step 424, the seller's unification gateway may signal (e.g., via module 308 and interface 326) to the POS device that the product and/or service may be provided to the buyer. Method 400 may eventually continue to step 426, where method 400 may stop.

Figure 5:
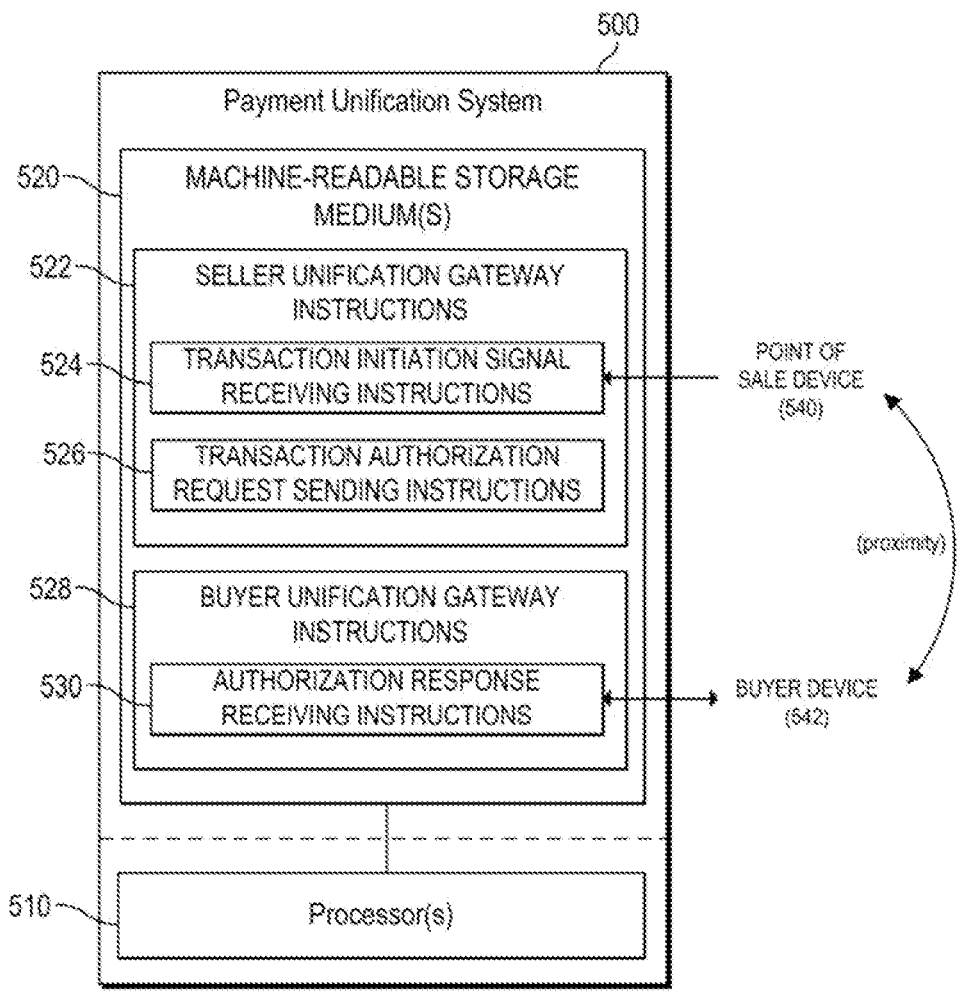
FIG. 5 is a block diagram of an example payment unification system that may be used with a point of sale device.

FIG. 5 is a block diagram of an example payment unification system. Payment unification system 500 may include at least one computing device that is accessible to payment services over the Internet or some other network. For example, a buyer's and seller's payment services may access the at least one computing device to download or otherwise retrieve unification gateway code that may be installed in the payment services. In some embodiments, payment unification system 500 may include more than one computing device, in which case, multiple processors and/or machine readable mediums may be involved. More details regarding an example payment unification system and/or service may be described, above, for example, with payment unification service 102 of FIGS. 1A and 1B. In the embodiment of FIG. 5, payment unification system 500 includes at least one machine-readable storage medium 520 and at least one processor 510.

Machine-readable storage medium(s) 520 may each be any electronic, magnetic, optical, or other physical storage device that stores executable instructions. Thus, machine-readable storage medium(s) 520 may each be, for example, Random Access Memory (RAM), an Electrically-Erasable Programmable Read-Only Memory (EEPROM), a storage drive, an optical disc, and the like. Machine-readable storage medium(s) 520 may each be disposed within a computing device of payment unification system 500. In this situation, the executable instructions may be installed or stored on the computing device. In this situation, computing devices (e.g., computing devices of payment services) external to payment unification system 500 may access, download and/or otherwise retrieve the executable instruction stored on machine-readable storage medium(s) 520. Alternatively, machine-readable storage medium(s) 520 may each be a portable (e.g., external) storage medium, for example, that allows a computing device (e.g., of payment services or of payment unification system 500) to remotely execute the instructions or download the instructions from the storage medium. In this situation, the executable instructions may be part of an installation package. As described below, machine-readable storage medium(s) 520 may each be encoded with executable instructions to facilitate payment unification.

Processor(s) 510 may each be one car more central processing units (CPUs), CPU cores, microprocessors, and/or other hardware devices suitable for retrieval and execution of instructions stored in at least one machine-readable storage medium (e.g., 520). Processor(s) 510 may each fetch, decode, and execute instructions (e.g., instructions 522, 524, 526, 528, 530) to, among other things, facilitate payment unification. In some situations, at least one processor of at least one computing device external to payment unification system may fetch, decode, and execute instructions. With respect to the executable instruction representations (e.g., boxes) shown in FIG. 5, it should be understood that part or all of the executable instructions included within one box may, in alternate embodiments, be included in a different box shown in the figures or in a different box not shown.

Seller unification gateway instructions 522 may include transaction initiation signal receiving instructions 524 and transaction authorization request sending instructions 526. Transaction initiation signal receiving instructions 524 may receive, via a network, a transaction initiation signal from a point of sale device. The transaction initiation signal may be in response to a purchase request of a buyer that interacts with the point of sale device. Transaction authorization request sending instructions 526 may send, via a network, a transaction authorization request to a buyer unification gateway. Buyer unification gateway instructions 528 may include authorization response receiving instructions 530. Authorization response receiving instructions 530 may receive, via a network, an authorization response from a buyer device near or in the point of sale device. The authorization response is generated in response to the buyer interacting with the buyer device.

Figure 6:
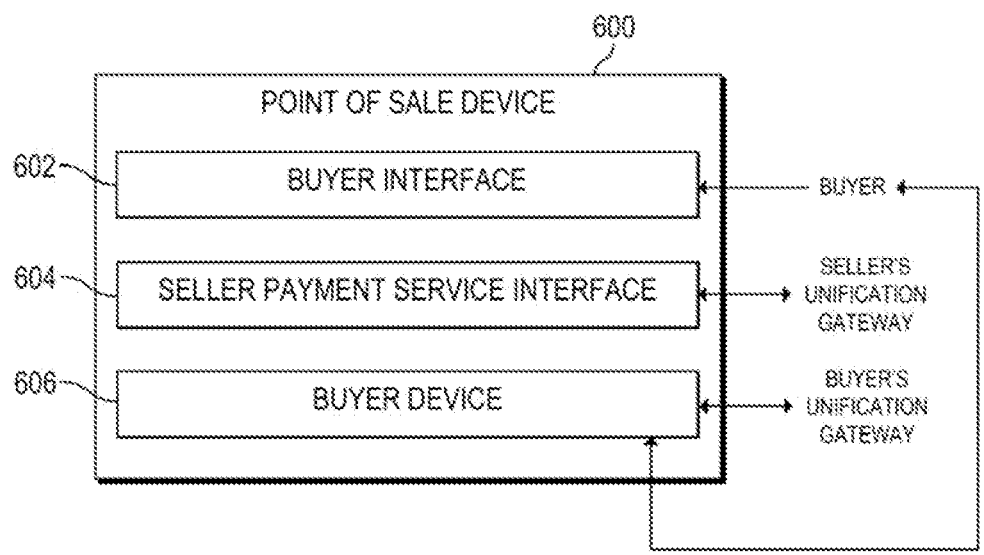
FIG. 6 is a block diagram of an example point of sale device that y leverage a payment unification service.

FIG. 6 is a block diagram of an example point of sale (POS) device. POS device 600 may be any kind of device that automatically receives and handles payment from buyers and/or automatically provides products and services to buyers. More details regarding an example POS device may be described above, for example, with regard to payment unification service 150 of FIGS. 1A and 1B. In the embodiment of FIG. 6, POS device 600 includes a buyer interface 602, a seller payment service interface 604 and a buyer device 606. The buyer interface 602 and the seller payment service interface 604 may be in communication with a POS device controller (e.g. 154), which may manage a various operations that allow buyers to pay for products and/or services and that allow products/services to be provided to buyers.

The buyer interface 602 may receive a purchase request from a buyer that is located local to the point of sale device. The seller payment service interface 604 may send, via a network, a transaction initiation signal to a first unification gateway associated with a first payment service of a seller. The transaction initiation signal may be in response to the purchase request. The buyer device 606 may receive, via a network, a transaction authorization request from a second unification gateway associated with a second payment service of the buyer. The buyer device may be further to send, to the second unification gateway, an authorization response that is generated in response to the buyer interacting with the buyer device. The seller payment service interface 604 may be further to receive, from the first unification gateway, the authorization response. The authorization response may indicate that a purchase process related to the purchase request of the buyer can proceed in the point of sale device.

Figure 7:
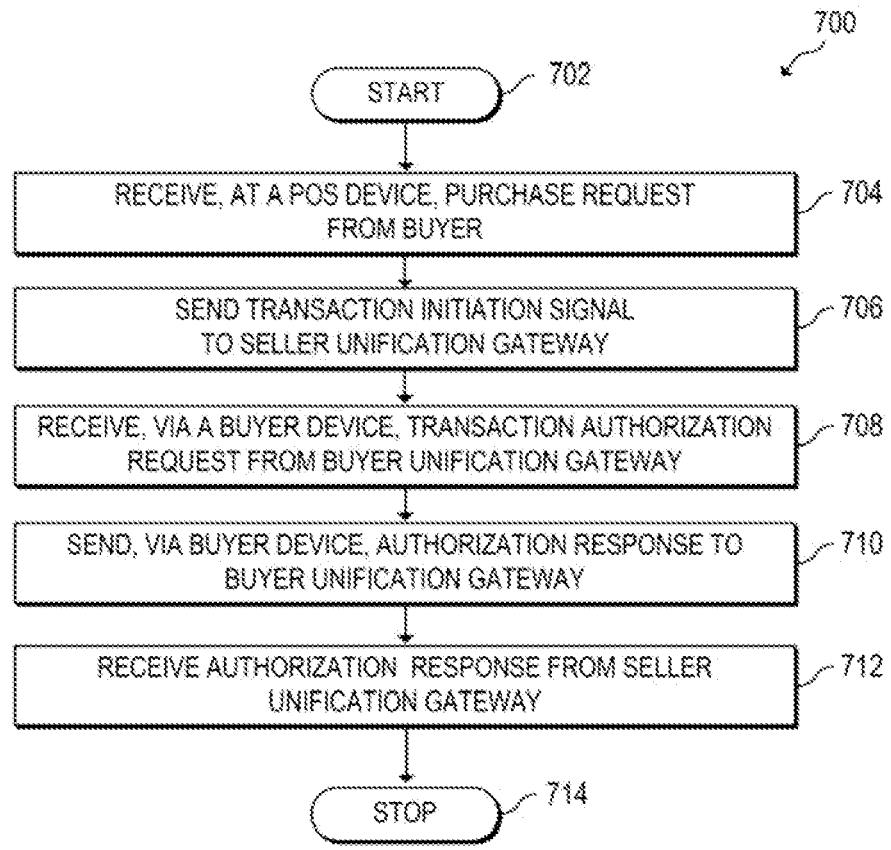
FIG. 7 is a flowchart of an example method that may be executed by a point of sale device leveraging a payment unification service.

FIG. 7 is a flowchart of an example method 700 that may be executed by a point of sale (POS) device leveraging a payment unification service, for example, point of sale device 150 of FIGS. 1A and 1B. Method 700 may be implemented in the form of executable instructions stored on at least one machine-readable storage medium and/or in the form of electronic circuitry. In alternate embodiments of the present disclosure, one or more steps of method 700 may be executed substantially concurrently or in a different order than shown in FIG. 7. In alternate embodiments of the present disclosure, method 700 may include more or less steps than are shown in FIG. 7. In some embodiments, one or more of the steps of method 700 may, at certain times, be ongoing and/or may repeat.

Method 700 may start at step 702 and continue to step 704, where the POS device may receive (e.g., via buyer interface 602) a purchase request from a buyer that is located local to the point of sale device. At step 706, the POS device may send (e.g., via seller payment service interface 604) a transaction initiation signal to a first unification gateway associated with a first payment service of a seller. The transaction initiation signal may be in response to the purchase request. At step 708, the POS device may receive (e.g., via buyer device 606) a transaction authorization request from a second unification gateway associated with a second payment service of the buyer. At step 710, the POS device may send (e.g., via buyer device 606) an authorization response to the second unification gateway. The authorization response may be generated in response to the buyer interacting with the buyer device. At step 712, the POS device may receive (e.g., via seller payment service interface 604) a transaction authorization signal from the first unification gateway. The transaction authorization signal may be based on the authorization response. The transaction authorization signal may indicate that a purchase process related to the purchase request of the buyer can proceed in the point of sale device. Method 700 may eventually continue to step 714, where method 700 may stop.

It will be appreciated that the previous description of the disclosed examples is provided to enable any person skilled in the art to make or use the present disclosure. Various modifications to these examples will be readily apparent to those skilled in the art, and the general principles defined herein may be applied to other examples without departing from the spirit or scope of the disclosure. Thus, the present disclosure is not intended to be limited to the examples shown herein but is to be accorded the widest scope consistent with the principles and novel features disclosed herein.

The invention claimed is:

1. A non-transitory machine-readable storage medium encoded with instructions that upon execution cause a system to:
   receive, by a seller unification gateway of a first payment service via a network, a transaction initiation signal from a point of sale device, wherein the transaction initiation signal is in response to a purchase request of a buyer that interacts with the point of sale device for purchase of a product or service from a seller;

communicate, by the seller unification gateway with a unification service, to identify a buyer unification gateway of a second payment service that is different from the first payment service;

send, by the seller unification gateway via the network, a transaction authorization request to the buyer unification gateway;

receive, by the seller unification gateway from the buyer unification gateway via the network, an authorization indication responsive to an authorization response from a buyer device near or in the point of sale device, the authorization response generated in response to the buyer interacting with the buyer device; and cause sending of payment from the second payment service to the first payment service for the purchase.

2. The non-transitory machine-readable storage medium of claim 1, wherein the instructions upon execution cause the system to:

send, by the seller unification gateway, a gateway lookup request, via the network, to the unification service to identify the buyer unification gateway, the gateway lookup request to cause a lookup of a gateway directory at the unification service, the gateway directory listing trusted unification gateways comprising the seller unification gateway and the buyer unification gateway; and receive, by the seller unification gateway, gateway connection information from the unification service, wherein the gateway connection information indicates how to communicate with the buyer unification gateway.

3. The non-transitory machine-readable storage medium of claim 2, wherein the transaction initiation signal includes a user identifier entered by the buyer at the point of sale device, and wherein the gateway lookup request includes the user identifier, wherein the transaction authorization request includes the user identifier, and wherein the buyer unification gateway uses the user identifier to identify the gateway connection information.

4. The non-transitory machine-readable storage medium of claim 1, wherein the authorization indication indicates that the purchase related to the purchase request of the buyer can proceed at the point of sale device.

5. The non-transitory machine-readable storage medium of claim 4, wherein the instructions upon execution cause the system to send, by the seller unification gateway in response to the authorization indication, a signal to the point of sale device that indicates that the purchase related to the purchase request of the buyer can proceed.

6. The non-transitory machine-readable storage medium of claim 1, wherein the buyer device is embedded into or physically connected to the point of sale device.

7. The non-transitory machine-readable storage medium of claim 1, wherein the buyer device is a mobile device of the buyer.

8. The non-transitory machine-readable storage medium of claim 1, wherein the instructions upon execution cause the system to:

aggregate a plurality of transactions relating to purchases involving the first payment service and the second payment service, the plurality of transactions comprising a transaction initiated by the transaction initiation signal and relating to the purchase request of the buyer, wherein the sending of the payment from the second payment service to the first payment service is part of an aggregate payment that is a sum of payments associated with the plurality of transactions.

9. The non-transitory machine-readable storage medium of claim 8, wherein the instructions upon execution cause the system to:

determine whether an amount of the aggregate payment of the plurality of transactions exceeds a threshold; and cause sending of the aggregate payment from the second payment service to the first payment service responsive to determining that the amount of the aggregate payment of the plurality of transactions exceeds the threshold.

10. The non-transitory machine-readable storage medium of claim 1, wherein the seller is registered with the first payment service but not the second payment service, and the buyer is registered with the second payment service but not the first payment service.

11. The non-transitory machine-readable storage medium of claim 10, wherein the sending of the payment from the second payment service to the first payment service causes the first payment service to pay the seller for the purchase of the product or service.

12. A system comprising:

a processor; and a non-transitory storage medium storing a first unification gateway executable on the processor to:

receive, via a network, a transaction initiation signal, the first unification gateway associated with a first payment service of a seller, wherein the transaction initiation signal is in response to a purchase request received at a point of sale device for purchase by a buyer of a product or service from the seller; and communicate, with a unification service, to identify a second unification gateway of a second payment service of the buyer, the second payment service different from the first payment service;

send, via the network, a transaction authorization request to the second unification gateway;

receive, via the network, an authorization indication from the second unification gateway responsive to an authorization response to a transaction authorization request from the second unification gateway to a buyer device, the authorization response generated in response to the buyer interacting with the buyer device; and cause sending of a payment from the second payment service to the first payment service for the purchase.

13. The system of claim 12, further comprising unification service instructions executable on the processor to:

aggregate a plurality of transactions relating to purchases involving the first payment service and the second payment service, the plurality of transactions comprising a transaction initiated by the transaction initiation signal and relating to the purchase request of the buyer, wherein the sending of the payment from the second payment service to the first payment service is part of an aggregate payment that is a sum of payments associated with the plurality of transactions.

14. The system of claim 13, wherein the unification service instructions are executable on the processor to:

determine whether an amount of the aggregate payment of the plurality of transactions exceeds a threshold; and cause sending of the aggregate payment from the second payment service to the first payment service responsive to determining that the amount of the aggregate payment of the plurality of transactions exceeds the threshold.

15. The system of claim 12, wherein the seller is registered with the first payment service but not the second payment service, and the buyer is registered with the second payment service but not the first payment service.

16. The system of claim 15, wherein the sending of the payment from the second payment service to the first payment service causes the first payment service to pay the seller for the purchase of the product or service.

17. A method for payment unification, comprising:
receiving, by a seller unification gateway from a point of sale device, a transaction initiation signal, the seller unification gateway being part of a first payment service of a seller, wherein the transaction initiation signal is in response to a purchase request received at the point of sale device for purchase by a buyer of a product or service from the seller;
communicating, by the seller unification gateway with a unification service, to identify a buyer unification gateway of a second payment service of the buyer, the second payment service different from the first payment service;
sending, by the seller unification gateway, a transaction authorization request to the buyer unification gateway;
receiving, by the seller unification gateway, an authorization indication from the buyer unification gateway responsive to an authorization response to a transaction authorization request from the buyer unification gateway to a buyer device, the authorization response generated in response to the buyer interacting with the buyer device; and
sending a payment from the second payment service to the first payment service for the purchase.

18. The method of claim 17, wherein the buyer device is embedded into or physically connected to the point of sale device.

19. The method of claim 17, wherein the buyer is not registered with the first payment service, and the seller is not be registered with the second payment service.

20. The method of claim 17, further comprising:
aggregating, by a transaction aggregator, a plurality of transactions relating to purchases involving the first payment service and the second payment service, the plurality of transactions comprising a transaction initiated by the transaction initiation signal and relating to the purchase request of the buyer,
wherein the sending of the payment from the second payment service to the first payment service is part of an aggregate payment that is a sum of payments associated with the plurality of transactions.

* * * * *